US012610898B2

(12) United States Patent
Tian et al.

(10) Patent No.: US 12,610,898 B2
(45) Date of Patent: Apr. 28, 2026

(54) METHOD FOR PRESERVING AND STRENGTHENING SEEDLINGS IN CONTINUOUS CROPPED COTTON FIELD WITH SOIL MOISTURE DEFICIENCY IN DESERT OASIS

(71) Applicants:Institute of Cash Crops, Xinjiang Academy of Agricultural Sciences, Urumqi (CN); Shihezi University, Shihezi (CN)

(72) Inventors: Liwen Tian, Urumqi (CN); Honghai Luo, Shihezi (CN); Zhanbiao Wang, Urumqi (CN); Na Zhang, Urumqi (CN); Yu Tian, Urumqi (CN); Min Zhu, Urumqi (CN); Jun Wang, Urumqi (CN); Lizhao Zhang, Urumqi (CN); Yongtao Lu, Urumqi (CN); Changwen Liu, Urumqi (CN); Zhi Chen, Shihezi (CN); Xia Yan, Urumqi (CN)

(73) Assignees: Institute of Cash Crops, Xinjiang Academy of Agricultural Sciences (Xinjiang Uygur Autonomous Region Cotton Research Institute, Xinjiang Uygur Autonomous Region Sugar Beet Improvement Center), Urumqi (CN); SHIHEZI UNIVERSITY, Shihezi (CN)

( * ) Notice: Subject to any disclaimer, the term of this patent is extended or adjusted under 35 U.S.C. 154(b) by 0 days.

(21) Appl. No.: 19/032,056

(22) Filed: Jan. 18, 2025

(65) Prior Publication Data

US 2025/0248346 A1 Aug. 7, 2025

(51) Int. Cl.
A01G 22/50 (2018.01)
A01C 7/20 (2006.01)
A01G 25/02 (2006.01)
(52) U.S. Cl.
CPC ............... *A01G 22/50* (2018.02); *A01C 7/20* (2013.01); *A01G 25/023* (2013.01)
(58) Field of Classification Search
CPC ............................... A01G 22/50; A01C 21/00
See application file for complete search history.

(56) References Cited

FOREIGN PATENT DOCUMENTS

AU       2021104223 A4 * 9/2021 .......... A01C 21/005
CN       115474534 A  * 12/2022 ............ A01G 25/16
NL         2027990 B1 * 10/2022 ............ A01G 22/50

* cited by examiner

*Primary Examiner* — Christopher D Hutchens
(74) *Attorney, Agent, or Firm* — Yue (Robert) Xu; Apex Attorneys at Law, LLP

(57) ABSTRACT

A method for preserving and strengthening seedlings in a continuous cropped cotton field with soil moisture deficiency in a desert oasis includes the steps of seedbed establishment, sowing and drip irrigation tape laying, soil moisture supply through drip irrigation after sowing, and field management after emergence. Within 0-2 days of a suitable sowing period for cotton, land plowing, harrowing and smoothing operations are completed, wherein a combined land preparer adopts a diverting soil leveling frame design that does not comprise any harrow groups. The drip irrigation tape is either a drip irrigation tape with a labyrinth on one side or a drip irrigation tape inlaid with emitters inside. After sowing, the first drip irrigation for soil moisture supply is generally carried out within 24 hours, and the second drip irrigation is followed after 3 to 5 days. After the cotton emerges, the planting rows are then covered with soil.

10 Claims, 3 Drawing Sheets

1

2

3

4

5

METHOD FOR PRESERVING AND STRENGTHENING SEEDLINGS IN CONTINUOUS CROPPED COTTON FIELD WITH SOIL MOISTURE DEFICIENCY IN DESERT OASIS

TECHNICAL FIELD

The present disclosure belongs to the technical field of cotton planting, and in particular relates to method for preserving and strengthening seedlings in a continuous cropped cotton field with soil moisture deficiency in a desert oasis.

BACKGROUND OF THE INVENTION

To achieve the goals of full, early, and vigorous emergence of cotton seedlings, besides sowing at the appropriate time, it is usually necessary to ensure suitable soil moisture in the cotton field at the time of sowing. Although the main cotton-producing regions of Xinjiang, which have typical desert oasis characteristics, receive significant snowfall in winter, the amount of snowfall is generally insufficient to meet the needs of cotton emergence. Additionally, there is significant variability in snowfall among different cotton-producing regions. As a result, if pre-sowing irrigation (either winter or spring irrigation) is not performed to store moisture in the soil before spring sowing, the soil moisture content will be inadequate, leading to difficulties in normal sowing and adversely affecting cotton emergence. Even when pre-sowing irrigation is performed, inadequate irrigation volume or improper soil preparation and leveling methods can result in soil moisture conditions that are insufficient for normal cotton emergence.

Years of research have shown that due to the unique natural environment of cotton-producing regions in Xinjiang, the conventional practice to create a suitable moisture environment for seedling preservation involves performing a large-volume fixed-amount winter or spring irrigation, or even both, before cotton sowing to meet the "water for emergence" needs of cotton. Typically, the water requirement for a single winter or spring irrigation is generally 160 to 230 m³/mu. By the time the appropriate sowing period arrives, fertilization and soil preparation are initiated to ensure that the soil moisture content in the cotton field ready for sowing is maintained between 13.0% and 16.7%. In the absence of other interfering factors, the cotton field can achieve a high quality of seedling preservation after sowing. From the above analysis, pre-sowing irrigation in cotton fields typically has two major characteristics: one is the large volume of water used, and the other is the concentration of water use periods, mainly from mid-November to the end of December of the previous year and from mid-February to March 20th of the current year. However, during this time, the temperature in oasis cotton-producing regions is low, and the temperature in the high mountain regions and surrounding areas, which are the main water sources, is even lower, making it difficult for snowmelt from high mountains to melt in large quantities. Xinjiang has a perennial cultivated area of over 37.5 million mu, and the contradiction between the large-area, high-quota pre-sowing irrigation demand and the limited snowmelt supply is extremely prominent. Every year, millions of mu of cotton fields cannot be sown during the optimal sowing period due to delays in winter or spring irrigation, leading to late emergence of cotton, ultimately resulting in lower yields and quality. Some cotton fields have to be switched to other crops due to severe delays in irrigation, and some are forced to fallow due to a lack of available water for irrigation. Even in cases where cotton fields have a guaranteed water source, improper irrigation or soil preparation methods can lead to poor soil moisture conditions, thus affecting normal cotton emergence. These issues pose a serious threat to cotton production in Xinjiang.

Further investigation and analysis reveal that other cotton-producing regions in the world with similar ecological zones to Xinjiang encounter similar problems. Due to the lack of effective methods to preserve seedlings, these areas generally adopt the approach of controlling the scale of land development and reducing the area of cotton cultivation. This inevitably affects the income and economic development of local cotton farmers to a certain extent.

After long-term investigation and analysis, many experts, including the inventor, believe that reducing the irrigation quota is the best solution to the current contradiction between water supply and demand in cotton fields. For cotton fields with soil moisture deficiency due to low snowfall in winter in cotton-growing counties, cities, and townships, the inventor adopts the method of supplementing soil moisture with drip irrigation after sowing. Specifically, when the cotton fields have not undergone large-quota pre-sowing irrigation or the pre-sowing irrigation is insufficient, and the relative soil moisture content in the tillage layer is only 35 to 50% at the time of sowing, corresponding technical measures are taken, including seedbed establishment, sowing and drip irrigation tape laying, soil moisture supply through water dripping after sowing, and field management after emergence. Among these measures, soil moisture supply through water dripping after sowing utilizes the favorable conditions of rapid temperature rise and increased mountain snowmelt after sowing to adjust the conventional large-volume irrigation (160 to 230 m³/mu) performed from October 20th of the previous year to March 25th of the current year to small-quota drip irrigation immediately after sowing. This adjustment helps extend the irrigation cycle and increase water supply. Coupled with a significant reduction in the irrigation quota for cotton fields, this approach effectively alleviates the contradiction between water scarcity and the large scale of cotton planting. At the same time, it effectively creates a growth environment with sufficient moisture and low salinity in the cotton seed holes and the local areas around the cotton seed holes, thus enabling limited water resources to irrigate more cotton fields. This ensures that cotton is sown during the optimal sowing period, preventing the need to switch to other crops or even fallow land. This also avoids the risks and damage caused by rain disasters during the seedling stage in Xinjiang's cotton-producing regions, ultimately achieving the goals of full, early, and vigorous seedling emergence.

The desert oasis in Xinjiang is the largest cotton-growing area in China and one of the most important cotton-producing regions globally, with a perennial planting area of approximately 37.5 million mu and a total production accounting for more than 20% of the global output. Due to the remarkable effectiveness of the method of the disclosure, it has far-reaching implications for the sustained development of local cotton production and social stability.

SUMMARY OF THE INVENTION

An object of the present disclosure is to provide a method for preserving and strengthening seedlings in a continuous cropped cotton field with soil moisture deficiency in a desert oasis, the method is carried out by the steps of seedbed establishment, sowing and drip irrigation tape laying, soil moisture supply through drip irrigation after sowing, and field management after emergence. Within 0-2 days of a suitable sowing period for cotton, land plowing, harrowing and smoothing operations are completed, and during the operation of harrowing and smoothing, a combined land preparer used adopts a diverting soil leveling frame design. When the temperature is suitable, sowing is performed immediately after the seedbed is established. The drip irrigation tape selected is either a drip irrigation tape with a labyrinth on one side or a drip irrigation tape inlaid with emitters inside. The drip irrigation tape is laid in the field using a "two-rows-one-tape sandwich mode", and it can also be placed on one side of the narrow row. After sowing, the first drip irrigation for soil moisture supply is generally carried out within 24 hours, and the second drip irrigation is followed after 3 to 5 days. The volumes of water for the two drip irrigations are 8 to 15 m³ and 15 to 30 m³, respectively. Drip application of a water-soluble phosphate fertilizer and a humic acid-based fertilizer dissolved in irrigation water can be performed. After the cotton emerges, the planting rows are then covered with soil.

The operation of the present disclosure is carried out in the following steps:

1) seedbed establishment: in a desert oasis, selecting a cotton field where a groundwater level is greater than and equal to 1.0 m and a soil salt content is less than and equal to 0.8% in a 0-15 cm tillage layer before soil preparation, wherein the cotton field is equipped with a drip irrigation facility compatible with cotton planting; and within 0-2 days of a suitable sowing period for cotton in that year, completing land plowing, harrowing and smoothing operations to ensure that a relative soil moisture content in a 0-30 cm tillage layer of the cotton field is maintained at 35-50% from the completion of soil preparation to the beginning of cotton sowing;

wherein, during the operation of harrowing and smoothing, for the cotton fields with the sandy loam soil and those with a high sand content, a combined land preparer with a diverting soil leveling frame design that does not include any harrow groups is used, and the diverting soil leveling frame includes a soil leveling frame group (1), an inward-facing V-shaped soil diverting and guiding group (2), a soil scraping and leveling plate group (3), an outward-facing V-shaped soil diverting and guiding group (4), and a compaction roller group (5) (FIG. 1); for the cotton fields with a high clay content or where a compaction roller is unable to effectively crush large soil clumps with a maximum length being greater than and equal to 3 cm, a conventional combined land preparer with a harrow group (a notched harrow group, a disk harrow group, a spike-tooth harrow group, or a combination of two of these harrow groups) or a power-driven harrow for soil crushing is still used;

2) sowing and drip irrigation tape laying: in the absence of abnormal weather conditions such as low temperatures and rainfall, and when the temperature is suitable, performing sowing immediately after the seedbed is established, wherein a selected sowing machine is a multifunctional precision sowing machine having the function of drip irrigation tape laying and equipped with a Beidou satellite navigation system; the drip irrigation tape selected is either a disposable (referring to a single cotton growth cycle, the following applies similarly) drip irrigation tape with a labyrinth on one side or a drip irrigation tape inlaid with emitters inside (both with a pipe diameter of 16 mm, an emitter spacing of 200 to 300 mm, a working pressure of 0.1 MPa or above), and irrigation uniformity of 90% or above, when the drip irrigation tape is laid, emitters are placed upwards, and flow channels are of a zigzag type, an S-shape type or a derivative type thereof (the derivative type refers to a shape that falls between the zigzag type and the S-type), wherein the main parameters of the drip irrigation tape with a labyrinth on one side are: an emitter flow rate is 1.5 to 3.2 L/h, and a laying length of a single drip irrigation tape in the field is 50 to 100 m; the main parameters of the drip irrigation tape inlaid with emitters inside are: an emitter flow rate is 0.8 to 2.8 L/h, and a laying length of a single drip irrigation tape in the field is 70 to 130 m;

in a wide-narrow row planting pattern, for the cotton fields with a high sand content, the drip irrigation tape is laid in the middle of a narrow row (i.e. "the two-rows-one-tape sandwich mode"), while for the cotton fields with a moderate or high clay content, the drip irrigation tape is laid either in the middle (i.e. "the two-rows-one-tape sandwich mode") or on one side of the narrow row;

in an equal-row spacing planting pattern (the row spacing in the field is 76 cm on average), the drip irrigation tape is laid on one side of a planting row (i.e. "one row, one strip");

in any case, only one drip irrigation tape is laid between two planting rows (the wide row or the narrow row) in the cotton field;

3) soil moisture supply through water dripping after sowing: generally, carrying out first drip irrigation for soil moisture supply within 24 hours after sowing, with a drip irrigation volume of 8 to 15 m³/mu, one day after water dripping, stabilizing the relative soil moisture content in the tillage layer where the seed holes (or seed planting holes) and the surrounding drip irrigation infiltration areas are located at 58% to 73%, usually, performing second water dripping 3 to 5 days later, with a drip irrigation volume of 15 to 30 m³/mu, wherein surface ponding is strictly avoided during each water dripping, and surface water or groundwater with a mineralization degree of 0.5 to 2.2 g/L is used for drip irrigation; and when water dripping is performed in the cotton field, drip application of monoammonium phosphate dissolved in irrigation water with an application rate of 1 to 2 kg/mu, or potassium dihydrogen phosphate dissolved in irrigation water with an application rate of 500 to 1000 g/mu, or water-soluble diammonium phosphate dissolved in irrigation water with an application rate of 1 to 2 kg/mu, or urea phosphate dissolved in irrigation water with an application rate of 1 to 2 kg/mu, along with fully soluble humic acid dissolved in irrigation water with an application rate of 1.2 to 2.5 kg/mu is performed, wherein other fertilizers with similar nutrition and soil physicochemical property improvement capabilities can also be used, and a fully soluble soil conditioner is able to be used to replace the humic acid fertilizer; and 4) field management after emergence: after the cotton emerges to the stage of two leaves and one heart or three leaves and one heart, covering the planting rows by using a specialized soil-covering machine that does not compress the seedlings and sealing the seed holes; and advancing the first irrigation after all the cotton seedlings emerge to the upper and middle ten days of May, usually accompanied by drip application of fully soluble pure nitrogen (N) dissolved in irrigation water with an application rate of 1.2 to 1.5 kg/mu and pure phosphorus pentoxide ($P_2O_5$) dissolved in irrigation water with an application rate of 0.5 to 1.0 kg/mu.

Detailed description is given below:

Step 1):

in cotton-producing regions where winter precipitation is less than and equal to 15 mm, if predications indicate that the high sand content, low groundwater levels, poor soil moisture conditions, or actual production of the cotton fields has verified that there will be a risk of sowing machine bogging down during sowing in the following year, irrigation is performed (including before or after mechanized harvesting of cotton in the previous year, or before cotton sowing in the same year) by using the drip irrigation facility in the field, with the irrigation volume being 40 to 60 $m^3$/mu, or by using conventional border irrigation, with the irrigation volume being 60 to 80 $m^3$/mu. Wherein, drip irrigation is used before mechanical harvesting of cotton in the previous year, and the specific irrigation time is based on the condition that the soil moisture does not affect the normal operation of mechanical harvesting, and the conventional border irrigation is used before cotton sowing in the same year, usually about 20 days before sowing.

The suitable sowing period for cotton fields in that year is from April 5th to 18th. Before cotton sowing, the soil needs to be plowed to a depth of 28 to 32 cm, and operations such as harrowing, leveling, and smoothing the soil should be carried out in a timely manner after plowing.

The number of the inward-facing V-shaped soil diverting and guiding groups (2) and outward-facing V-shaped soil diverting and guiding groups (4) needs to be increased as appropriate based on the width of the soil leveling frame, with the arrangement designed in a staggered front-and-rear pattern; and the diameter of the compaction rollers in the compaction roller group (5) is 400 to 600 mm.

For the operations of plowing, harrowing, leveling, smoothing, and compacting in cotton fields, the sequence of soil preparation is to handle sandy soils with a low clay content, sandy loam soils with a moderate clay content, and then saline-alkali soils with a high clay content to guarantee that after soil preparation, the surface soil of the cotton field has appropriate looseness and humidity, thus ensuring that the sowing machine does not bog down during operation. For the cotton fields with a high sand content, low soil moisture, or a tendency to lose moisture easily, the operation mode of "early soil preparation, quick sowing, and continuous soil preparation and sowing" should be adopted. During sowing in such cotton fields, compared with other types of cotton fields, the tractor's force arm used for sowing should be lifted by 3 to 5 cm.

Before the final pass of harrowing and smoothing, a chemical weed sealing operation is performed on the soil, a selected herbicide is a 33% pendimethalin emulsifiable concentrate dissolved in irrigation water with an application rate of 150 to 180 mL/mu, for the cotton fields with severe *Solanum nigrum* infestation, a 50% prometryn wettable powder dissolved in irrigation water with an application rate of 100 to 150 g/mu or a 42% fluridone suspension agent dissolved in irrigation water with an application rate of 100 to 150 mL/mu is adopted for chemical sealing.

For the established cotton fields ready for "dry seeding with irrigation for emergence", the difference in elevation of the seedbed per mu does not exceed ±5 cm, and the overall difference in elevation across the entire field does not exceed ±12.5 cm, and soil clods larger than 3 cm in maximum length either appear sporadically on the surface or not at all.

Step 2):

when the drip irrigation tape with a labyrinth on one side is used, the principle to follow is that the higher the sand content of the soil, the larger the emitter flow rate of the drip irrigation tape is, and the smaller the emitter spacing is, typically, for cotton fields with a high clay content or compacted cotton fields, the emitter flow rate of the drip irrigation tape is 1.5 to 1.9 L/h with an emitter spacing of 275 to 300 mm, for sandy loam cotton fields with a moderate clay content, the emitter flow rate of the drip irrigation tape is 2.0 to 2.7 L/h with an emitter spacing of 230 to 275 mm, for cotton fields with a high sand content or gravelly cotton fields, the emitter flow rate of the drip irrigation tape is 2.8 to 3.2 L/h with an emitter spacing of 200 to 230 mm; when the drip irrigation tape inlaid with emitters inside is used, the emitter flow rate follows the same principle: the higher the sand content of the soil, the larger the emitter flow rate is, and the smaller the emitter spacing is.

When the drip irrigation tape is placed on one side of the narrow row, the distance from the laying position of the drip irrigation tape to the nearest planting row is 6 to 8 cm.

For the wide-narrow row planting, under the premise of ensuring the width sum of the wide row and the narrow row is 76 cm, the wide row is 63-66 cm wide, and the corresponding narrow row is 13-10 cm wide, a hole seeder duckbill of the sowing machine used in the cotton fields adopts a normal non-offset pointed-tip design, with a duckbill length of 2.7 to 3.0 cm and a seeding depth of 2.5 to 3.0 cm, however, when the drip irrigation tape is laid in the middle of the narrow row, the narrow row spacing must be adjusted to 13 cm, and the hole seeder duckbill of the sowing machine adopts an offset pointed-tip design, with the duckbill length and the seeding depth being unchanged.

Other methods related to seeding and drip irrigation tape laying should follow the practices of surrounding conventional high-yield cotton fields.

After the sowing operation is completed, it is necessary to immediately inspect the quality of soil covering, film pressing, and film fixation for windproofing, and promptly address any deficiencies in film fixation for windproofing during mechanical seeding.

Step 3):

if it has been verified over the years that applying water dripping only once can still achieve full emergence after sowing without affecting the later growth and development, then applying water dripping only once is acceptable.

Step 4):

when covering the soil and sealing the holes mechanically after emergence, no compaction is applied to the soil-covered rows.

For the cotton fields where the aforementioned method has been used for 2 to 3 consecutive years, if the soil salt content in the 0 to 15 cm tillage layer exceeds 0.8% before soil preparation, the cotton field needs to be adjusted to undergo at least one year of large-volume irrigation, 120 to 180 $m^3$/mu, before sowing to store moisture and suppress salt, and the method of immediately dripping water to increase soil moisture after sowing for seedling preservation is not used.

The technical solutions of the above embodiments of the present disclosure have the following beneficial effects:

after applying the method of the present disclosure, the cotton seedling survival rate of the cotton fields in each embodiment was investigated separately in 2022 and 2023 after emergence. Five to eight random points were surveyed for each embodiment, and simultaneously, the seedling survival rate of the cotton fields in the surrounding areas that were sown during the same period and used the conventional seedling preserving method was also investigated. The results showed that, in scenarios without rain disaster hazards, the average seedling survival rate of the method of the present disclosure was 85.3%, which was comparable to that of high-yield cotton fields in the surrounding areas using the conventional seedling preserving method. In scenarios with rain disaster hazards, the seedling survival rate of the method of the present disclosure was 21.8 percentage points higher on average than that of the cotton fields using the conventional seedling preserving method. Additionally, the growth process of cotton in the cotton fields using the method of the present disclosure was 3 to 5 days earlier than that of the cotton fields that were sown during the same period and used the conventional seedling preserving method. Furthermore, this method could significantly reduce irrigation quota, decrease inputs in cotton fields, and effectively prevent rain disaster hazards. Therefore, the method of the present disclosure could meet production requirements.

The present disclosure has been described above in detail, but the above embodiments are merely exemplary in nature and are not intended to limit the present disclosure. Furthermore, the present disclosure is not limited by any theory described in the foregoing prior art or summary or in the following embodiments.

DETAILED DESCRIPTION OF THE INVENTION

The present disclosure will now be further described with reference to the following embodiments. It should be noted that the following embodiments are provided for illustrative purposes only and are not to be construed as limiting the scope of the disclosure as claimed.

Unless otherwise indicated, the raw materials, reagents, and methods used in the embodiments are conventional within the field.

The following embodiments were performed in the Third Regiment of the First Division in Aksu Prefecture, as well as in Awati County, Korla City, and Yuli County of Xinjiang, during the period from 2022 to 2023.

The diverting soil leveling frame and the multifunctional hole-type mechanical cotton precision sowing machine both originated from Xinjiang Tiancheng Agricultural Machinery Manufacturing Co., Ltd.

Embodiment One

Figure 1:
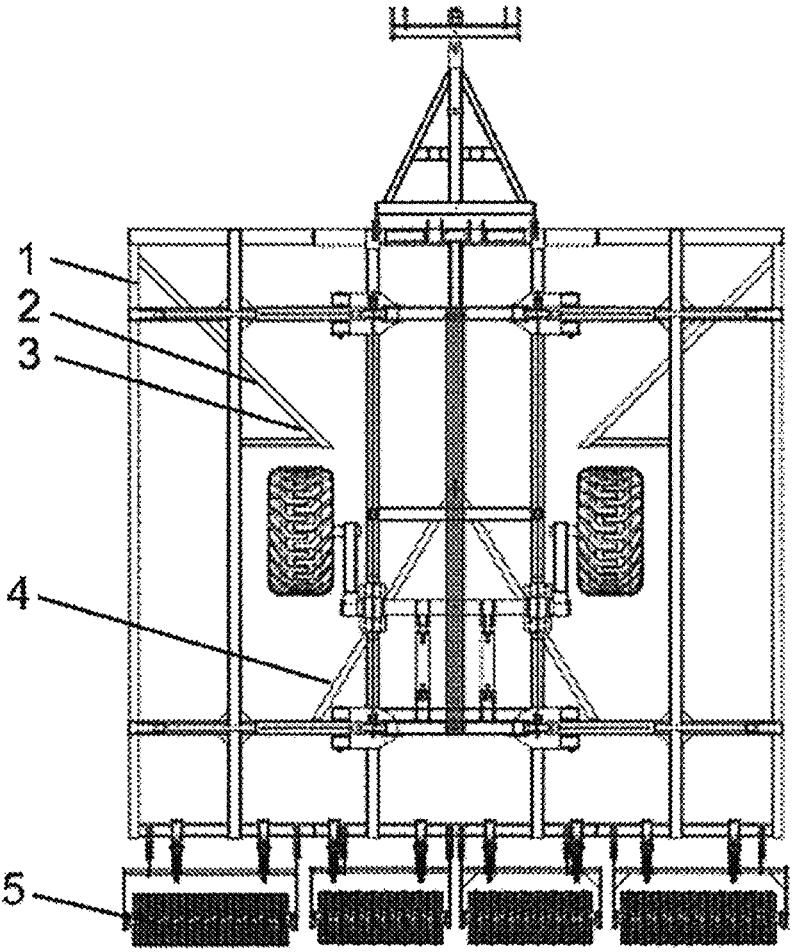
FIG. 1 is a schematic diagram of main components for soil leveling and crushing of a diverting soil leveling frame according to an embodiment of the present disclosure;
Illustration: 1—soil leveling frame group; 2—inward-facing V-shaped soil diverting and guiding group; 3—soil scraping and leveling plate group; 4—outward-facing V-shaped soil diverting and guiding group; 5—compaction roller group.

In 2022, at the new technology demonstration field of the Third Regiment of the First Division in Aksu Prefecture, the cotton field covered an area of 230 mu, with a soil texture of sandy loam and a groundwater level of 2.0 m. Before soil preparation, the soil salt content in the 0-15 cm tillage layer was 0.4%. On April 9th, the deep plowing operation was performed in the cotton field to a depth of 30 cm. Following the plowing, a combined land preparer equipped with a diverting soil leveling frame design (FIG. 1) without any harrow groups was used to perform harrowing and leveling operations. The diameter of the compaction roller of the leveling frame was 500 mm. The leveled land met the standards of being "uniform, loose, clean, flat, and finely crushed" with a height difference of 5 cm per mu and a total height difference of 14 cm across the entire field. Additionally, there were no large soil clumps greater than or equal to 3 cm in size within the cotton field. The relative soil moisture content in the 0-30 cm tillage layer was 41%. Before the final pass of harrowing and smoothing, a 33% pendimethalin emulsifiable concentrate dissolved in irrigation water with an application rate of 150 mL/mu was used for soil sealing.

Figure 3:
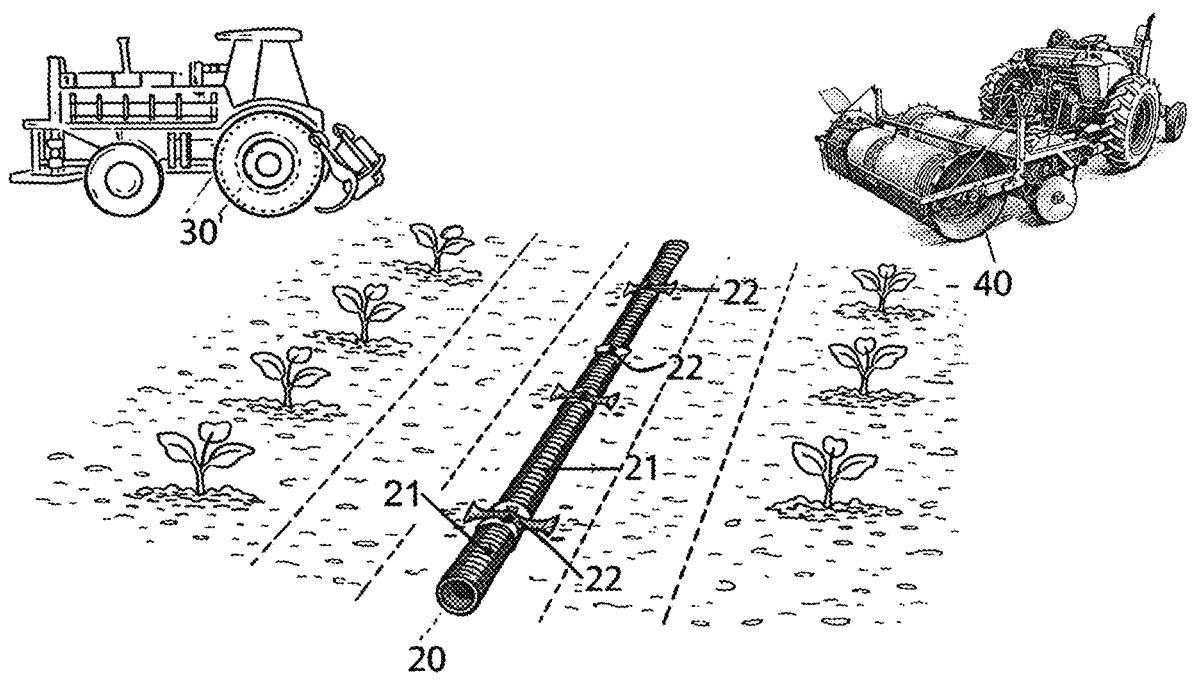
FIG. 3 is a schematic diagram showing mechanical parts and operations for irrigation, sowing, and soil-covering in fields according to an embodiment of the present disclosure.

On April 10th, a multifunctional hole-type mechanical cotton precision sowing machine 30 having the drip irrigation tape laying function and equipped with a Beidou Satellite Navigation System was used in the cotton field for performing the planting operation in a "one film covering six rows" mode with a row spacing of (66+10) cm. As shown in FIG. 3, During sowing, in addition to not performing soil covering and compaction over the cotton seed rows, the machine completed a series of operations in one pass, including seedbed shaping, trench digging, drip irrigation tape laying, film laying, soil covering and film pressing on the film, hole punching, and precision seeding. The selected hole seeder duckbill of the sowing machine 30 was of a normal non-offset design, with a duckbill length of 2.8 cm and a seeding depth of 2.8 cm. The cotton field was equipped with a drip irrigation tape 20 inlaid with emitters inside, with a pipe diameter of 16 mm. The spacing between emitters 22 was 230 mm, and the working pressure was greater than and equal to 0.1 MPa. The flow channels were of a derivative zigzag shape. The emitter flow rate was 2.2 L/h. The drip irrigation tape was laid on one side of the narrow row of cotton plants, with a distance of 8 cm from the planting row. The emitters were positioned upwards. The length of a single drip irrigation tape laid was 130 m, and the uniformity of irrigation was greater than and equal to 90%. Other field operations related to sowing and drip irrigation tape laying, such as soil covering and film pressing, laying of ground lateral pipes, and connecting of capillary pipes, should be performed with reference to conventional high-yield cotton fields in the surrounding areas. After sowing was completed, manual inspection should be promptly carried out to ensure the quality of soil covering and film pressing.

After sowing, drip irrigation was performed using canal water with a mineralization degree of 0.8 g/L, with a water dripping volume of 13.0 m³/mu, and drip application of potassium dihydrogen phosphate dissolved in irrigation water with an application rate of 0.5 kg/mu was performed. The next day, a survey found that the relative soil moisture content in the 0-30 cm soil layer within the seed holes and their surrounding drip irrigation infiltration areas was 64%. On April 15th, the second drip irrigation was performed with a water dripping volume of 23 m³/mu, and drip application of water-soluble diammonium phosphate dissolved in irrigation water with an application rate of 2.0 kg/mu was performed. On May 3rd, the first irrigation after cotton emergence was performed with a water dripping volume of 20 m³/mu, and drip application of urea dissolved in irrigation water with an application rate of 3 kg/mu (equivalent to an approximately application rate of 1.4 kg/mu of pure N) and potassium dihydrogen phosphate with an application rate of 1.5 kg/mu (equivalent to an approximately application rate of 0.78 kg/mu of pure $P_2O_5$) was performed. On May 13th (when the cotton plants had two leaves and one heart), a specialized soil covering machine 40 was used to cover the soil and seal the seed holes in the planting rows.

All other cotton field management practices were performed according to the conventional methods for local high-yield drip irrigation cotton fields with wide and narrow rows and in the "one film covering six rows" mode.

Embodiment Two

In 2023, at the Six Brigade of the Third Regiment of the First Division in Aksu Prefecture, the cotton field covered an area of 100 mu, with a soil texture of sandy loam and a groundwater level of 2.1 m. Before soil preparation, the soil salt content in the 0-15 cm tillage layer was 0.3%. On April 6th, the deep plowing operation was performed in the cotton field to a depth of 28 cm. Following the plowing, a combined land preparer equipped with a diverting soil leveling frame design (FIG. 1) without any harrow groups was used to perform harrowing and leveling operations. The diameter of the compaction roller of the leveling frame was 600 mm. The leveled land met the standards of being "uniform, loose, clean, flat, and finely crushed" with a height difference of 5 cm per mu and a total height difference of 16 cm across the entire field. Additionally, there were no large soil clumps greater than or equal to 3 cm in size within the cotton field. The relative soil moisture content in the 0-30 cm tillage layer was 35.3%. Before the final pass of harrowing and smoothing, a 33% pendimethalin emulsifiable concentrate dissolved in irrigation water with an application rate of 180 ml/mu was used for soil sealing.

After the soil preparation was completed on April 6th, the cotton field was immediately planted using a multifunctional hole-type mechanical cotton precision sowing machine having the drip irrigation tape laying function and equipped with a Beidou Satellite Navigation System. The planting was done in a "one film covering three rows" mode with an equal row spacing of 76 cm. The selected hole seeder duckbill of the sowing machine was of a normal non-offset design with a duckbill length of 2.7 cm and a seeding depth of 3.0 cm. In addition to not performing soil covering and compaction over the cotton seed rows, the machine completed a series of operations in one pass, including seedbed shaping, trench digging, drip irrigation tape laying, film laying, soil covering and film pressing on the film, hole punching, and precision seeding. About 50 mu of the cotton fields used the drip irrigation tape 20 with a labyrinth 21 on one side, while another 50 mu used the drip irrigation tape inlaid with emitters inside. Both types of drip irrigation tapes had a pipe diameter of 16 mm, an emitter spacing of 260 mm, and a working pressure of 0.1 MPa or above, and the flow channels were S-shaped. The drip irrigation tape 20 with a labyrinth 21 on one side had an emitter flow rate of 2.5 L/h, while the drip irrigation tape 20 inlaid with emitters 22 inside had an emitter flow rate of 1.5 L/h. Both types of drip irrigation tapes were laid in a "one row, one tape" mode, i.e., the drip irrigation tape was laid on one side of the planting row, and was 6 cm away from it. During laying, the emitters were placed upwards, with each drip irrigation tape being 70 m long and having an irrigation uniformity of 90% or above. Other field operations related to sowing and drip irrigation tape laying, such as soil covering and film pressing, laying of ground lateral pipes, and connecting of capillary pipes, should be performed with reference to conventional high-yield cotton fields in the surrounding area. After sowing was completed, manual inspection should be promptly carried out to ensure the quality of soil covering and film pressing.

On the second day after sowing (April, 7th), drip irrigation was performed using well water with a mineralization degree of 1.5 g/L, with a water dripping volume of 15.0 m³/mu, and drip application of water-soluble monoammonium phosphate dissolved in irrigation water with an application rate of 2.0 kg/mu was performed. The next day, a survey found that the relative soil moisture content in the 0-30 cm soil layer within the seed holes and their surrounding drip irrigation infiltration areas was 71.5%. On April 11th, the second drip irrigation was performed with a water dripping volume of 30 m³/mu, and drip application of potassium dihydrogen phosphate dissolved in irrigation water with an application rate of 1.0 kg/mu and fully soluble humic acid dissolved in irrigation water with an application rate of 2.5 kg/mu was performed. On May 1st, the first irrigation after cotton emergence was performed with a water dripping volume of 20 m³/mu, and drip application of urea dissolved in irrigation water with an application rate of 3.3 kg/mu (equivalent to an approximately application rate of 1.52 kg/mu of pure N) and potassium dihydrogen phosphate with an application rate of 2 kg/mu (equivalent to an approximately application rate of 1.04 kg/mu of pure $P_2O_5$) was performed. On May 10th (when the cotton plants had two leaves and one heart), a specialized soil covering machine was used to cover the soil and seal the seed holes in the planting rows.

All other cotton field management practices were performed according to the conventional methods for local high-yield drip irrigation cotton fields with an equal row spacing of 76 cm and in the "one film covering three rows" mode.

Embodiment Three

In 2022, at the Shifen Field of Sanhe Town, Awati County, Xinjiang, the cotton field covered an area of 80 mu, the soil texture of the cotton field was sandy, with a groundwater level of 2.5 m. Before soil preparation, the salt content in the 0-15 cm tillage layer was 0.3%. The planting pattern in this cotton field was wide-narrow row planting with one film covering six rows, with a row spacing of (63+13) cm. On April 11th, the deep plowing operation was performed in the cotton field to a depth of 32 cm. Following the plowing, a combined land preparer equipped with a diverting soil leveling frame design (FIG. 1) without any harrow groups was used to perform harrowing and leveling operations. The diameter of the compaction roller of the leveling frame was 600 mm. The leveled land met the standards of being "uniform, loose, clean, flat, and finely crushed" with a height difference of 7 cm per mu and a total height difference of 24 cm across the entire field. Additionally, there were no large soil clumps greater than or equal to 3 cm in size within the cotton field. The relative soil moisture content in the 0-30 cm tillage layer was 43.5%. During soil preparation, before the final pass of harrowing and smoothing, a 50% prometryn wettable powder dissolved in irrigation water with an application rate of 120 g/mu is used to perform soil sealing, thus preventing and controlling *Solanum nigrum* infestation in the cotton fields.

On April 12th, the cotton field was planted using a multifunctional hole-type mechanical cotton precision sowing machine having the drip irrigation tape laying function and equipped with a Beidou Satellite Navigation System. In addition to not performing soil covering and compaction over the cotton seed rows, the machine completed a series of operations in one pass, including seedbed shaping, trench digging, drip irrigation tape laying, film laying, soil covering and film pressing on the film, hole punching, and precision seeding. During sowing, the selected hole seeder duckbill of the sowing machine was of an offset pointed-tip design with a duckbill length of 3.0 cm and a seeding depth of 2.5 cm. During sowing, the tractor's arm force was increased by 3 cm compared to the conventional level. In Embodiment Three, about half of the cotton fields used the drip irrigation tape with a labyrinth on one side, while another 40 mu used the drip irrigation tape inlaid with emitters inside. Both types of drip irrigation tapes had a pipe diameter of 16 mm, an emitter spacing of 200 mm, and a working pressure of 0.1 MPa or above, and the flow channels were all zigzag-shaped. The drip irrigation tape with a labyrinth on one side had an emitter flow rate of 3.2 L/h, while the drip irrigation tape inlaid with emitters inside had an emitter flow rate of 2.8 L/h. Both types of drip irrigation tapes were laid in between two narrow rows, i.e., adopting the "two-rows-one-tape sandwich mode" layout mode in the field. During laying, the emitters were placed upwards, with each drip irrigation tape being 100 m long and having an irrigation uniformity of 90% or above. Other field operations related to sowing and drip irrigation tape laying, such as soil covering and film pressing, laying of ground lateral pipes, and connecting of capillary pipes, should be performed with reference to conventional high-yield cotton fields in the surrounding area. After sowing was completed, manual inspection should be promptly carried out to ensure the quality of soil covering and film pressing.

On the second day after sowing (April 13th), drip irrigation was performed using canal water with a mineralization degree of 0.52 g/L, with a water dripping volume of 14.0 m³/mu, and drip application of water-soluble monoammonium phosphate dissolved in irrigation water with an application rate of 1.0 kg/mu was performed. The next day, a survey found that the relative soil moisture content in the 0-30 cm soil layer within the seed holes and their surrounding drip irrigation infiltration areas was 60.3%. On April 16th, the second drip irrigation was performed with a water dripping volume of 25 m³/mu, and drip application of urea phosphate dissolved in irrigation water with an application rate of 2.0 kg/mu and fully soluble humic acid dissolved in irrigation water with an application rate of 1.2 kg/mu was performed. On May 7th, the first irrigation after cotton emergence was performed with a water dripping volume of 20 m³/mu, and drip application of urea dissolved in irrigation water with an application rate of 2.6 kg/mu (equivalent to an approximately application rate of 1.2 kg/mu of pure N) and potassium dihydrogen phosphate with an application rate of 1 kg/mu (equivalent to an approximately application rate of 0.521 kg/mu of pure P₂O₅) was performed. On May 19th (when the cotton plants had three leaves and one heart), a specialized soil covering machine was used to cover the soil and seal the seed holes in the planting rows.

All other cotton field management practices were performed according to the conventional methods for local high-yield drip irrigation cotton fields with wide and narrow rows and in the "one film covering six rows" mode.

Embodiment Four

In 2023, at Tuosumukuli Village, Sanhe Town, Awati County, Xinjiang, the cotton field covered an area of 150 mu, with a soil texture of sandy loam and a groundwater level of 2.30 m. Before soil preparation, the soil salt content in the 0-15 cm tillage layer was 0.6%. Due to the high sand content in nearly 35 mu of cotton fields in this plot, machine bogging down occurred during sowing in previous years. In order to avoid this phenomenon from happening again, these nearly 35 mu of cotton fields with high sand content in this embodiment were irrigated (drip irrigation) with well water with a mineralization degree of 0.80 g/L on Sep. 20, 2022 (mechanical harvesting on October 8), with an irrigation volume of 50 m³/mu; the remaining hundred mu of cotton fields were not subjected to irrigation treatment.

On Apr. 4, 2023, the deep plowing operation was performed in the cotton field to a depth of 28 cm. Following the plowing, a combined land preparer equipped with a diverting soil leveling frame design (FIG. 1) without any harrow groups was used to perform harrowing and leveling operations. The diameter of the compaction roller of the leveling frame was 600 mm. The leveled land met the standards of being "uniform, loose, clean, flat, and finely crushed" with a height difference of 6 cm per mu and a total height difference of 18 cm across the entire field. Additionally, there were no large soil clumps greater than or equal to 3 cm in size within the cotton field. The relative soil moisture content in the 0-30 cm tillage layer was 40.8%. Before the final pass of harrowing and smoothing, a 50% prometryn wettable powder dissolved in irrigation water with an application rate of 150 g/mu is used to perform soil sealing.

On April 5th, the cotton field was planted using a multifunctional hole-type mechanical cotton precision sowing machine having the drip irrigation tape laying function and equipped with a Beidou Satellite Navigation System. The planting was done in a "one film covering three rows" mode with a row spacing of 76 cm. The selected hole seeder duckbill of the sowing machine was of a normal non-offset design with a duckbill length of 2.7 cm and a seeding depth of 3.0 cm. During sowing the 10 mu of cotton fields with high sand content, the tractor's arm force was increased by 5 cm compared to the conventional level. When the cotton fields used the drip irrigation tape inlaid with emitters inside, a pipe diameter was 16 mm, and an emitter spacing was 230 mm, and a working pressure was 0.1 MPa or above, and flow channels were of an S-shaped derivative type. The emitter flow rate was 2.2 L/h, the drip irrigation tape was laid in a "one row, one tape" mode, i.e., the drip irrigation tape was laid on one side of the planting row, and was 7 cm away from it. During laying, the emitters were placed upwards, with each drip irrigation tape being 70 m long and having an irrigation uniformity of 90% or above.

On the second day after sowing, drip irrigation was performed using well water with a mineralization degree of 2.2 g/L, with a water dripping volume of 15.0 m³/mu, and drip application of water-soluble monoammonium phosphate dissolved in irrigation water with an application rate of 1.0 kg/mu was performed. The next day, a survey found that the relative soil moisture content in the 0-30 cm soil layer within the seed holes and their surrounding drip irrigation infiltration areas was 63.6%. On April 9th, the second drip irrigation was performed with a water dripping volume of 28 m³/mu, and drip application of monoammonium phosphate dissolved in irrigation water with an application rate of 1.5 kg/mu and fully soluble humic acid dissolved in irrigation water with an application rate of 2.5 kg/mu was performed. On May 2nd, the first irrigation after cotton emergence was performed with a water dripping volume of 20 m³/mu, and drip application of urea dissolved in irrigation water with an application rate of 2.8 kg/mu (equivalent to an approximately application rate of 1.3 kg/mu of pure N) and potassium dihydrogen phosphate with an application rate of 1.54 kg/mu (equivalent to an approximately application rate of 0.8 kg/mu of pure $P_2O_5$) was performed. On May 16th (when the cotton plants had three leaves and one heart), a specialized soil covering machine was used to cover the soil and seal the seed holes in the planting rows.

All other cotton field management practices were performed according to the conventional methods for local high-yield drip irrigation cotton fields with an equal row spacing of 76 cm and in the "one film covering three rows" mode.

Embodiment Five

Figure 2:
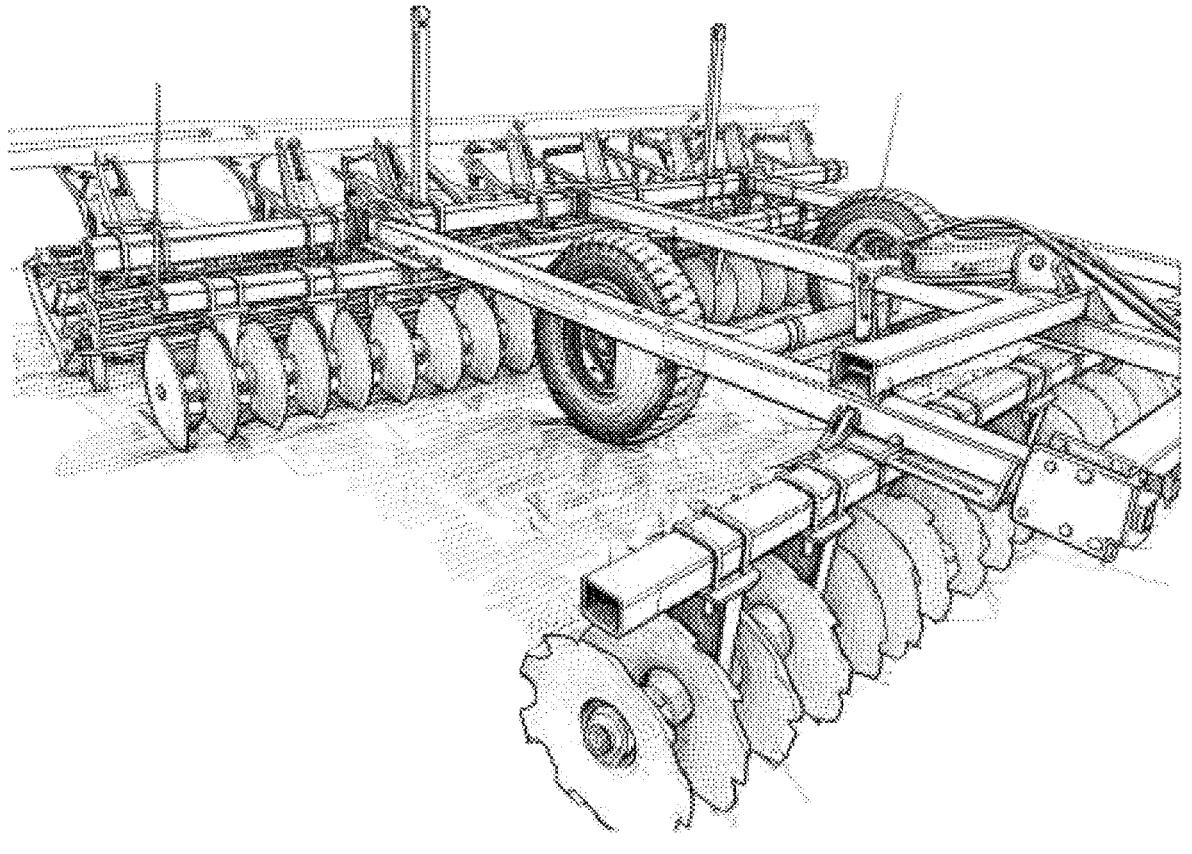
FIG. 2 is a physical diagram of a conventional land preparer.

In 2022, at the new cotton planting technology demonstration area of the Xinjiang Academy of Agricultural Sciences, Puhui Township, Korla City, Xinjiang, the cotton field covered an area of 90 mu, with a soil texture of clay loam and a groundwater level of 1.6 m. Before soil preparation, the soil salt content in the 0-15 cm tillage layer was 0.8%. On April 9th, the deep plowing operation was performed in the cotton field to a depth of 30 cm. Following the plowing, a conventional land preparer equipped with harrow groups and small-diameter compaction rollers (such as the patent CN207560673U) or a conventional land preparer with a combination of harrow groups (notch harrow groups+disk harrow groups) as shown in FIG. 2 was used to perform harrowing and leveling operations on the cotton field. The leveled land met the standards of being "uniform, loose, clean, flat, and finely crushed" with a height difference of 9 cm per mu and a total height difference of 24 cm across the entire field. The relative soil moisture content in the 0-30 cm tillage layer was 49.8%. Additionally, there were no large soil clumps greater than or equal to 3 cm in size within the cotton field. Before the final pass of harrowing and smoothing, a 42% fluridone suspension agent dissolved in irrigation water with an application rate of 150 mL/mu was adopted for soil sealing.

On April 9th, the cotton field was planted using a multi-functional hole-type mechanical cotton precision sowing machine having the drip irrigation tape laying function and equipped with a Beidou Satellite Navigation System. The planting was done in a "one film covering three rows" mode with a row spacing of 76 cm. The selected hole seeder duckbill of the sowing machine was of a normal non-offset design with a duckbill length of 2.8 cm and a seeding depth of 2.5 cm. About 45 mu of the cotton fields used the drip irrigation tape with a labyrinth on one side, with an emitter spacing of 300 mm, and a working pressure of 0.1 MPa or above, and flow channels were of an S-shaped derivative type, an emitter flow rate was 1.5 L/h. Other 45 mu of the cotton fields used the drip irrigation tape inlaid with emitters inside, with an emitter spacing of 300 mm, and a working pressure of 0.1 MPa or above, and flow channels were S-shaped, an emitter flow rate was 0.8 L/h. Both types of drip irrigation tapes had a pipe diameter of 16 mm, the drip irrigation tapes were laid in a "one row, one tape" mode, i.e., the drip irrigation tape was laid on one side of the planting row, and was 7 cm away from it. During laying, the emitters were placed upwards, with each drip irrigation tape being 80 m long and having an irrigation uniformity of 90% or above. Other field operations related to sowing and drip irrigation tape laying, such as soil covering and film pressing, laying of ground lateral pipes, and connecting of capillary pipes, should be performed with reference to conventional high-yield cotton fields in the surrounding area. After sowing was completed, manual inspection should be promptly carried out to ensure the quality of soil covering and film pressing.

After sowing (April, 10th), drip irrigation was performed using well water with a mineralization degree of 1.3 g/L, with a water dripping volume of 10.0 m³/mu, and drip application of water-soluble monoammonium phosphate dissolved in irrigation water with an application rate of 2.0 kg/mu was performed. The next day, a survey found that the relative soil moisture content in the 0-30 cm soil layer within the seed holes and their surrounding drip irrigation infiltration areas was 67%. On April 13th, the second drip irrigation was performed with a water dripping volume of 18 m³/mu, and drip application of urea phosphate dissolved in irrigation water with an application rate of 1 kg/mu and fully soluble humic acid dissolved in irrigation water with an application rate of 1.5 kg/mu was performed. Due to heavy rainfall on April 28th, the soil in the cotton field became severely compacted. On May 2nd (during the seedling stage of cotton, before reaching the stage of two leaves and one heart), a cultivator with soil-crushing wheels was first used to cultivate and crush the soil. Subsequently, a soil-covering machine was employed to take soil from the inter-row spaces of the cotton plants and cover the seed holes in the cotton rows. On May 10th, the first irrigation after cotton emergence was performed with a water dripping volume of 20 m³/mu, and drip application of urea dissolved in irrigation water with an application rate of 3.0 kg/mu (equivalent to an approximately application rate of 1.4 kg/mu of pure N) and potassium dihydrogen phosphate with an application rate of 1.92 kg/mu (equivalent to an approximately application rate of 1.0 kg/mu of pure $P_2O_5$) was performed.

All other cotton field management practices were performed according to the conventional methods for local high-yield drip irrigation cotton fields with an equal row spacing of 76 cm and in the "one film covering three rows" mode.

Embodiment Six

In 2023, at Xibuymali Village, Gulebage Township, Yuli County, Xinjiang, the cotton field covered an area of 180 mu, with a soil texture of sandy loam and a groundwater level of 1.80 m. Before soil preparation, the soil salt content in the 0-15 cm tillage layer was 0.4%. On April 17th, the deep plowing operation was performed in the cotton field to a depth of 30 cm. Following the plowing, a combined land preparer equipped with a diverting soil leveling frame design (FIG. 1) without any harrow groups was used to perform harrowing and leveling operations. The diameter of the compaction roller of the leveling frame was 600 mm. The leveled land met the standards of being "uniform, loose, clean, flat, and finely crushed" with a height difference of 11 cm per mu and a total height difference of 23 cm across the entire field. Additionally, there were no large soil clumps greater than or equal to 3 cm in size within the cotton field. The relative soil moisture content in the 0-30 cm tillage layer was 45.6%. Before the final pass of harrowing and smoothing, a 42% fluridone suspension agent dissolved in irrigation water with an application rate of 100 mL/mu was used for soil sealing.

On April 18th, the cotton field was planted using a multifunctional hole-type mechanical cotton precision sowing machine having the drip irrigation tape laying function and equipped with a Beidou Satellite Navigation System. The planting was done in a "one film covering six rows" mode with a row spacing of (63+13) cm. During sowing, the selected hole seeder duckbill of the sowing machine was of an offset pointed-tip design with a duckbill length of 2.8 cm and a seeding depth of 2.5 cm. The cotton fields used the drip irrigation tape with a labyrinth on one side, a pipe diameter was 16 mm, and an emitter spacing was 275 mm, and a working pressure was 0.1 MPa or above, and the flow channels were of an S-shaped derivative type. The emitter flow rate was 2.0 L/h. The drip irrigation tapes were laid in between two narrow rows, i.e., adopting the "two-rows-one-tape sandwich mode" layout manner in the field. During laying, the emitters were placed upwards, with each drip irrigation tape being 100 m long and an irrigation uniformity of 90% or above. Other field operations related to sowing and drip irrigation tape laying, such as soil covering and film pressing, laying of ground lateral pipes, and connecting of capillary pipes, should be performed with reference to conventional high-yield cotton fields in the surrounding area. After sowing was completed, manual inspection should be promptly carried out to ensure the quality of soil covering and film pressing.

Due to windy weather the day after sowing, the first drip irrigation was postponed to April 20th. Drip irrigation was performed using alpine snowmelt water with a mineralization degree of 0.6 g/L, with a water dripping volume of 12.0 $m^3$/mu, and drip application of water-soluble monoammonium phosphate dissolved in irrigation water with an application rate of 1.0 kg/mu was performed. The next day, a survey found that the relative soil moisture content in the 0-30 cm soil layer within the seed holes and their surrounding drip irrigation infiltration areas was 59.8%. On April 23rd, the second drip irrigation was performed with a water dripping volume of 25 $m^3$/mu, and drip application of urea phosphate dissolved in irrigation water with an application rate of 1 kg/mu and fully soluble humic acid dissolved in irrigation water with an application rate of 2.0 kg/mu was performed. On May 12th, the first irrigation after cotton emergence was performed with a water dripping volume of 20 $m^3$/mu, and drip application of urea dissolved in irrigacation rate of 0.8 kg/mu of pure $P_2O_5$) was performed. Due to poor weather conditions from April 24th to May 5th, with frequent occurrences of gale and rainfall, soil compaction was observed in the cotton fields. When the weather cleared up, on May 8th (when the cotton plants had two leaves and one heart), a cultivator with soil-crushing wheels was first used to cultivate and crush the soil. Subsequently, a soil-covering machine was employed to take soil from the inter-row spaces of the cotton plants and cover the seed holes in the cotton rows.

All other cotton field management practices were performed according to the conventional methods for local high-yield drip irrigation cotton fields with narrow and wide rows and in the "one film covering six rows" mode.

Implementation Results: from May 1st to 22nd of the year when the embodiments were implemented, the cotton seedling survival rate of each implementation site of the present disclosure was investigated. At the same time, cotton fields in the vicinity of the embodiments that underwent conventional winter or spring irrigation were used as controls, and their seedling survival rates were also investigated. Five to eight points were randomly selected for investigation in each embodiment and its surrounding control, respectively. The results showed that the seedling survival rate of the method of the present disclosure ranged from 81.2% to 87.5%, with an average of 85.3%. Wherein, in scenarios without rain disaster hazards, the average seedling survival rate was 86.8% (Embodiments 1, 2, 3, and 4), which was basically the same as the seedling survival rate (86.98%) of the surrounding high-yield cotton fields that used conventional seedling preservation methods. In scenarios with rain disaster hazards, the seedling survival rate of the present disclosure (Embodiments 5, and 6) was up to 24.7 percentage points higher than that of the surrounding cotton fields that used conventional seedling preservation methods. The specific data are shown in Table 1. Therefore, the present disclosure had good protection against rain disaster hazards, and the growth process of cotton in the cotton fields was 3 to 5 days earlier than that in cotton fields using conventional seedling preservation methods in the same sowing period. Additionally, this method could significantly reduce the irrigation quota, saving up to 202 $m^3$/mu of water compared with conventional winter (or spring) irrigation cotton fields, and eliminating the pre-sowing conventional irrigation (winter or spring irrigation) costs (including the costs of creating ridges, labor for irrigation, and water fees) of approximately 100 yuan/mu.

TABLE 1

| Comparison of seedling survival rates (%) between the embodiments of the present disclosure and the controls | | | | | | | | | | | | | | | | | | |
|---|---|---|---|---|---|---|---|---|---|---|---|---|---|---|---|---|---|---|
| | Embodiments | | | | | | Controls | | | | | | Difference between embodiments and controls | | | | | |
| No. | 1 | 2 | 3 | 4 | 5 | 6 | 1 | 2 | 3 | 4 | 5 | 6 | 1 | 2 | 3 | 4 | 5 | 6 |
| Seed survival rate | 85.9 | 87.3 | 86.5 | 87.5 | 83.3 | 81.2 | 88.2 | 87.0 | 83.3 | 89.4 | 58.6 | 62.4 | −2.3 | 0.3 | 3.2 | −1.9 | 24.7 | 18.8 |
| Average | | | 85.3 | | | | | | 78.2 | | | | | | 7.13 | | | |

Note:
the controls with the same serial numbers as the embodiments are the controls in the vicinity of the embodiments. (Embodiments 1-4 and their corresponding controls are in scenarios without rain disaster hazards, while Embodiments 5-6 and their corresponding controls are in scenarios with rain disaster hazards)

tion water with an application rate of 2.8 kg/mu (equivalent to an approximately application rate of 1.3 kg/mu of pure N) and potassium dihydrogen phosphate with an application rate of 1.54 kg/mu (equivalent to an approximately appli- The above embodiments are merely used to illustrate the technical solutions of the present disclosure by way of example, and are not intended to limit them. Although the present disclosure has been described in detail with reference to the foregoing embodiments, those skilled in the art will understand that the technical solutions described in the foregoing embodiments may be modified, or some or all of the technical features may be equivalently replaced without departing from the spirit and essence defined by the claims of the present disclosure; although such modifications or substitutions are still within the scope defined by the claims of the present disclosure.

The invention claimed is:

1. A method for preserving and strengthening seedlings in a continuous cropped cotton field with soil moisture deficiency in a desert oasis, comprising the steps as follows:

1) Seedbed establishment: in a desert oasis, selecting a cotton field where a groundwater level is greater than or equal to 1.0 m and a soil salt content is less than and equal to 0.8% in a 0-15 cm tillage layer before soil preparation, wherein the cotton field is equipped with a drip irrigation facility compatible with cotton planting; and within 0-2 days of a sowing period for cotton in a year, completing land plowing, harrowing and smoothing operations to ensure that a relative soil moisture content in a 0-30 cm tillage layer of the cotton field is maintained at 35-50% from the completion of soil preparation to the beginning of cotton sowing;

wherein, during the operation of harrowing and smoothing, for cotton fields with sandy loam soil, a combined land preparer with a diverting soil leveling frame design that does not comprise any harrow groups is used, and the diverting soil leveling frame comprises a soil leveling frame group, an inward-facing V-shaped soil diverting and guiding group, a soil scraping and leveling plate group, an outward-facing V-shaped soil diverting and guiding group, and a compaction roller group; for cotton fields with a high clay content or where the compaction roller group is unable to effectively crush large soil clumps with a maximum length being greater than or equal to 3 cm, a conventional combined land preparer with a harrow group or a power-driven harrow for soil crushing is still used;

2) Sowing and drip irrigation tape laying: in the absence of weather conditions comprising low temperatures and rainfall, and when the temperature is in a predetermined range, performing sowing immediately after the seedbed is established, wherein a selected sowing machine is a multifunctional precision sowing machine having a function of drip irrigation tape laying and equipped with a Beidou satellite navigation system; a drip irrigation tape selected is either a drip irrigation tape with a labyrinth on one side or a drip irrigation tape inlaid with emitters inside, both with a pipe diameter of 16 mm, an emitter spacing of 200 to 300 mm, a working pressure of 0.1 MPa or above, and irrigation uniformity of 90% or above, when the drip irrigation tape is laid, emitters are placed upwards, and flow channels are selected from at least one of a zigzag type and an S-shape type, wherein main parameters of the drip irrigation tape with a labyrinth on one side are: an emitter flow rate is 1.5 to 3.2 L/h, and a laying length of a single drip irrigation tape in the field is 50 to 100 m; the main parameters of the drip irrigation tape inlaid with emitters inside are: an emitter flow rate is 0.8 to 2.8 L/h, and a laying length of a single drip irrigation tape in the field is 70 to 130 m;

in a wide-narrow row planting pattern, for the cotton fields with sandy loam soil, the drip irrigation tape is laid in the middle of a narrow row having a width of 10-13 cm, while for the cotton fields with a moderate or high clay content, the drip irrigation tape is laid either in the middle or on one side of the narrow row; in an equal-row spacing planting pattern, the drip irrigation tape is laid on one side of a planting row; in any case, only one drip irrigation tape is laid between two planting rows in the cotton field;

3) Soil moisture supply through water dripping after sowing: carrying out first drip irrigation for soil moisture supply within 24 hours after sowing, with a drip irrigation volume of 8 to 15 m³/mu, one day after water dripping, stabilizing the relative soil moisture content in the tillage layer where seed holes and surrounding drip irrigation infiltration areas are located at 58% to 73%, performing second water dripping 3 to 5 days later, with a drip irrigation volume of 15 to 30 m³/mu, wherein surface ponding is strictly avoided during each water dripping, and surface water or groundwater with a mineralization degree of 0.5 to 2.2 g/L is used for drip irrigation; and when water dripping is performed in the cotton field, drip application of monoammonium phosphate dissolved in irrigation water with an application rate of 1 to 2 kg/mu, or potassium dihydrogen phosphate dissolved in irrigation water with an application rate of 500 to 1000 g/mu, or water-soluble diammonium phosphate dissolved in irrigation water with an application rate of 1 to 2 kg/mu, or urea phosphate dissolved in irrigation water with an application rate of 1 to 2 kg/mu, or fully soluble humic acid dissolved in irrigation water with an application rate of 1.2 to 2.5 kg/mu is performed, and a fully soluble soil conditioner is configured to replace humic acid fertilizer; and 4) Field management after emergence: after the cotton emerges to a stage of two leaves and one heart or three leaves and one heart, covering the planting rows by using a soil covering machine that does not compress the seedlings and sealing the seed holes; and advancing the first irrigation after all the cotton seedlings emerge to the first ten days of May, accompanied by drip application of fully soluble pure nitrogen (N) dissolved in irrigation water with an application rate of 1.2 to 1.5 kg/mu and pure phosphorus pentoxide ($P_2O_5$) dissolved in irrigation water with an application rate of 0.5 to 1.0 kg/mu.

2. The method according to claim 1, wherein, in step 1), in cotton-producing regions where winter precipitation is less than and equal to 15 mm, if predications indicate that due to the sandy loam soil, low groundwater levels, poor soil moisture conditions, or actual production of the cotton fields, there will be a risk of the sowing machine bogging down during sowing in the following year, irrigation is performed before or after mechanized harvesting of cotton in a previous year, or before cotton sowing in the same year, when the drip irrigation facility in the field is used for water dripping, the irrigation volume is 40 to 60 m³/mu, when conventional border irrigation is used, the irrigation volume is 60 to 80 m³/mu, drip irrigation is used before mechanical harvesting of cotton in the previous year, and irrigation time is based on the condition that the soil moisture does not affect the normal operation of mechanical harvesting, and the conventional border irrigation is used before cotton sowing in the same year, about 20 days before sowing.

3. The method according to claim 1, wherein, in step 1), the number of the inward-facing V-shaped soil diverting and guiding groups and outward-facing V-shaped soil diverting and guiding groups is configured to be increased as appropriate based on the width of the soil leveling frame, with the arrangement designed in a staggered front-and-rear pattern; and the diameter of the compaction rollers in the compaction roller group (5) is 400 to 600 mm.

4. The method according to claim 1, wherein, in step 1), for the leveled cotton field, a difference in elevation of the seedbed per mu does not exceed ±5 cm, and an overall difference in elevation across the entire field does not exceed ±12.5 cm, and soil clods larger than 3 cm in maximum length either appear sporadically on a surface or not at all.

5. The method according to claim 1, wherein, in step 1), before a final pass of harrowing and smoothing, a chemical weed sealing operation is performed on the soil, a selected herbicide is a 33% pendimethalin emulsifiable concentrate dissolved in irrigation water with an application rate of 150 to 180 mL/mu, for cotton fields with severe *Solanum nigrum* infestation, a 50% prometryn wettable powder dissolved in irrigation water with an application rate of 100 to 150 g/mu or a 42% fluridone suspension agent dissolved in irrigation water with an application rate of 100 to 150 mL/mu is adopted for chemical sealing.

6. The method according to claim 1, wherein, in step 2), when the drip irrigation tape with a labyrinth on one side is used, based on that the higher the sand content of the soil, the larger the emitter flow rate of the drip irrigation tape is, and the smaller the emitter spacing is, for cotton fields with a high clay content or compacted cotton fields, the emitter flow rate of the drip irrigation tape is 1.5 to 1.9 L/h with an emitter spacing of 275 to 300 mm, for sandy loam cotton fields with a moderate clay content, the emitter flow rate of the drip irrigation tape is 2.0 to 2.7 L/h with an emitter spacing of 230 to 275 mm, for cotton fields with sandy loam soil or gravelly cotton fields, the emitter flow rate of the drip irrigation tape is 2.8 to 3.2 L/h with an emitter spacing of 200 to 230 mm; when the drip irrigation tape inlaid with emitters inside is used, the emitter flow rate follows the same principle: the higher the sand content of the soil, the larger the emitter flow rate is, and the smaller the emitter spacing is.

7. The method according to claim 1, wherein, in step 2), when the drip irrigation tape is placed on one side of the narrow row, a distance from a laying position of the drip irrigation tape to the nearest planting row is 6 to 8 cm.

8. The method according to claim 1, wherein, in step 2), for the wide-narrow row planting, under the premise of ensuring the width sum of the wide row and the narrow row is 76 cm, the wide row is 63-66 cm wide, and the corresponding narrow row is 13-10 cm wide, a hole seeder duckbill of the sowing machine used in the cotton fields adopts a normal non-offset pointed-tip design, with a duckbill length of 2.7 to 3.0 cm and a seeding depth of 2.5 to 3.0 cm, however, when the drip irrigation tape is laid in the middle of the narrow row, the narrow row spacing must be adjusted to 13 cm, and the hole seeder duckbill of the sowing machine adopts an offset pointed-tip design, with a duckbill length of 2.7 to 3.0 cm and a seeding depth of 2.5 to 3.0 cm.

9. The method according to claim 1, wherein, in step 4), when covering the soil and sealing the holes mechanically after emergence, no compaction is applied to the soil-covered rows.

10. The method according to claim 1, wherein, in step 4), for the cotton fields where the aforementioned method has been used for 2 to 3 consecutive years, if the soil salt content in the 0 to 15 cm tillage layer exceeds 0.8% before soil preparation, the cotton field is adjusted to undergo at least one year of large-volume irrigation, 120 to 180 m$^3$/mu, before sowing to store moisture and suppress salt, and the method of immediately dripping water to increase soil moisture after sowing for seedling preservation is not used.

* * * * *